United States Patent [19]
Kershman et al.

[11] Patent Number: 6,083,552
[45] Date of Patent: Jul. 4, 2000

[54] MICROWAVEABLE POPCORN PRODUCT AND METHOD

[75] Inventors: Alvin Kershman, Chesterfield, Mo.; Lisa Marie Schmidt, Waconia, Minn.; Michael Laurence Jensen, Spring Lake Park, Minn.; Lance Bernard Schilmoeller, Minnetonka, Minn.

[73] Assignee: SMTM Group, Chesterfield, Mo.

[21] Appl. No.: 09/255,349

[22] Filed: Feb. 23, 1999

[51] Int. Cl.[7] ...................................... A23L 1/025
[52] U.S. Cl. ............................ 426/559; 426/93; 426/94; 426/309; 426/234; 426/446; 426/242
[58] Field of Search ................................ 426/93, 94, 241, 426/242, 302, 309, 446, 450, 559, 234

[56] References Cited

U.S. PATENT DOCUMENTS

| | | | |
|---|---|---|---|
| 4,251,551 | 2/1981 | VanHulle et al. | 426/94 |
| 4,409,250 | 10/1983 | Van Hulle et al. | 426/242 |
| 4,496,816 | 1/1985 | McNamara | 219/10.55 E |
| 4,957,755 | 9/1990 | Causey | 426/242 |
| 5,108,772 | 4/1992 | Wilbur | 426/559 |
| 5,124,161 | 6/1992 | van Lengerich et al. | 426/94 |
| 5,834,046 | 11/1998 | Turpin et al. | 426/107 |

*Primary Examiner*—Milton Cano
*Attorney, Agent, or Firm*—Merchant & Gould P.C.

[57] ABSTRACT

Microwave snacks that include mixtures of popcorn and an expandable or puffable food pellet are disclosed. The pellets are gelatinized dough pellets which puff or expand upon microwave heating in a microwave oven. The pellets may be in the shape of cylinders, hollow barrels, spheres, chips, flakes, and the like. The popcorn and pellet mixture is preferably contained in an expandable bag or rigid tub with an oil/fat slurry. Although the popcorn requires a longer heating period to pop, the explosions created by the popcorn agitate the pellets to minimize burning and clumping of the pellets.

20 Claims, No Drawings

MICROWAVEABLE POPCORN PRODUCT AND METHOD

FIELD OF INVENTION

The present invention relates to microwaveable food products and their preparation. More particularly, the present invention relates to a combination of microwaveable popcorn and puffable starch products.

BACKGROUND

Microwave popcorn is an extremely popular snack item and over 175,000 tons of microwave popcorn products are sold annually, making popcorn a $1.1 billion worldwide annual business. Most microwave popcorn products come in an expandable paper bag filled with a mix of popcorn, oil, and optionally salt and butter. On exposure to 2 to 4 minutes of microwave energy, the oil rises in temperature along with the internal temperature of the kernals until the heat is sufficient to explode the popcorn kernels. Once the popcorn kernels have cooled to the point that they can be handled without burning fingers, millions of people enjoy the freshly popped snack.

To provide more taste variety than typical salt and butter, some popcorn products include other flavorings or additives to provide consumer choices for flavors such as cheese (single or multiple cheeses), herb, sour cream & chive, etc. Although the simplest method of applying these flavors to the popcorn is to sprinkle the flavoring over the already popped kernels, many consumers prefer the convenience of having the popcorn already flavored when it comes out of the bag. Typically, the flavoring is added as a powder or oil to the oil and salt mix before it is mixed with the popcorn kernels in the bag, but it is also known to provide a coating or layer of the flavoring directly on the popcorn kernel prior to it being placed in the bag.

In an attempt to capitalize on the popularity of microwave popcorn, many attempts have been made to produce other microwaveable snacks, for example, spherical pellets, barrels, and ellipsoids which puff upon microwave heating. Attempts have been made to make simulated popcorn, microwaveable pork rinds, cheese-coated puffed snacks, and similar snacks. However, other than the pork rinds, these snacks have not been available to the consumer because of the difficulties experienced with heating these products in a microwave and the lack of a viable product. Starch-based products, such as cheese-puffs and the like have a tendency to clump or agglomerate and burn, in part because the puffable pellets do not expand uniformly. The result is a large mass of undesirable starch material, part burned, part unpuffed and potentially under cooked.

U.S. Pat. No. 5,108,772 to Wilber attempted to solve burning problems of non-popcorn puffable snacks. Wilber disclosed that one problem with substituting puffable pellets for popcorn in the microwave snack is the lack of a sound cue to indicate completion of the microwave heating step. That is, pellets which gradually expand do not make a popping sound, so the consumer must rely on visual clues. Unfortunately, the majority of microwave snack bags are opaque paper. Thus, Wilber discloses a snack that comprises a microwave puffable or expandable pellet having a novel coating which confines expansion upon microwave heating and which exhibits sudden failure to provide the puffed product. The result is an exploding material which provides an audible clue as to when the product is done popping. However, the exploded snacks of Wilber closely resemble that of popcorn kernels. What is desired is a snack that enhances and complements popped popcorn, rather than attempting to imitate and replace it.

In addition to popcorn, consumers enjoy having a variety of different snack foods mixed together, for example, peanuts with pretzels, Chex Mix® and "trail mix". It is the combination of flavors, textures, sizes and spices that attracts eaters to these snack mixes. However, although consumers enjoy the variety a snack mix provides, the lure of fresh, hot popcorn usually prevails.

A consumer's snacking enjoyment may be greatly increased if a snack mix having various flavors, textures, and sizes could be obtained fresh and hot from the microwave. A snack that combines popcorn and another complementary snack would be optimal.

SUMMARY OF THE INVENTION

The present invention provides a microwaveable snack comprising a combination of popcorn and starch-based expandable pellets. The snack mix is subjected to microwave energy, causing the popcorn to explode and the starch-based pellets to puff, expand, or explode. According to the method of the present invention, scorching and burning of the starch-based pellets is minimized.

In one embodiment, a microwaveable bag, filled with popcorn, pellets, and an oil slurry is provided. Upon microwave heating, the pellets puff and the popcorn pops, providing a hot, delicious snack. Preferably, the weight ratio of the unpopped popcorn kernels to the pellets is about 2:1 to 1.5:1.

DETAILED DESCRIPTION

The present invention concerns a consumer snack including popped popcorn combined with a starch-based pellet that puffs or expands upon microwave heating. Further, the invention comprises a microwave bag having a charge of a plurality of popcorn kernels and a plurality of unpuffed pellets. Upon heating in a conventional microwave oven, the pellets puff and the popcorn pops. Typical problems associated with prior attempts to puff or expand products other than popcorn are solved by the combination of the present invention.

The popcorn is combined with the puffable pellets in a microwaveable container at a weight ratio of popcorn to pellets of about 3:1 to 1.25:1, more preferably about 2:1 to 1.5:1, and most preferably about 1.8:1. The combination of the popcorn kernels with the starch-based pellet product provides a hot, delicious snack that can be easily prepared at home by the consumer.

Popcorn Kernels

The popcorn used in the present invention can be any hulled or dehulled popcorn kernel known for use in microwave popcorn. The kernels may be large, medium, small, white, yellow, flavored, or any type of available kernel. Preferably, the popcorn kernels have an internal moisture level of about 11–14%.

Pellets

The pellets for use in the present invention are discrete, gelatinized, starch-based pellets. Pellets such as these are often known in the art as a "half product", meaning partially cooked or gelatinized pieces comprising puffable farinaceous dough. The pellets are produced by partially drying the dough after it has been shaped.

The term "puff" and its derivatives as used herein refer to the ability of the pellets expand in volume upon microwave heating in convention al consumer microwave ovens and to retain at least twice the original volume after cooling.

Although the term "pellet" is used when referring to the starch-based products, the products are not limited to pellet shaped or sized pieces, i.e., roughly spherical shapes. ather, the term "pellet" is used to encompass all three dimensional shapes, such as pheres, ellipses, cubes, and solid or hollow rods or cylinders having any cross-sectional area. "Pellets" also encompasses irregular shapes such as flat chips, flakes, double chips, crinkle cuts, and the like.

Typically, 10 grams of pellets includes 10–100 individual pellets, preferably about 30–60, and most preferably about 40–50 pellets per 10 grams.

The size of the pellets may range from about 0.1" (0.25 cm) to 1" (2.54 cm) in diameter. If a rod-shaped pellet is used, the length of the pellet may extend to at least 2" (5 cm) or more, depending on the recipe used for the pellet and the intended final snack product. In one embodiment, a rod-shaped pellet has approximately the same dimensions for its diameter and its length, for example, an outer diameter of about 0.30" (0.76 cm) to 0.40" (1.02 cm) and a length of about 0.20" (0.51cm) t o 0.25" (0.64 cm).

Although it is preferred that the pellets used in each mix have approximately the same size, it is possible to mix different shapes, sizes, and recipe formulations with the popcorn kernels in a single container.

Pellet Composition The pellets used in the present invention are generally a gelatinized dough known in the art as a "half product". Various amounts of farinaceous materials such as cereal flours or other starch materials are present in the pellets, but preferably the farinaceous materials comprise about 90–95% of the pellet.

Although it has been known that pellets such as the oxes used i n the present invention can be puffed or expanded by exposure to heat in a conventional oven, toaster, or fryer, it has not been possible until this invention to provide a microwave expanded starch-based pellet because of the tendency of the pellets to clump together, bunr, or the combination upon microwave heating. The particular combination of the present invention of the pellets with popcorn provides an optimal environment for both the pellets to expand and the popcorn to pop, without scorching or burning either the pellets or popcorn.

The base material for the pellets is a starch product, typically flour of some type. Examples of useable bases include corn flour including maize, masa, corn flour, wheat flour, rye flour, potato flour, rice, tapioca, millet, semolina, and combinations thereof. These flours and other starches may be chemically modified or unmodified. The base material typically comprises between about 60–95% by weight of the total pellet composition.

The base has an effect, not only on the final taste and consistency of the final pellet, but also on the processability of the composition. For example, the use of corn flour or masa leads to increased pellet production velocity because there is less swelling of the flour during processing. "Masa" is corn flour which has usually been treated to be alkaline. The use of the term "corn flour" herein will be used to designate both "corn flour" and "masa". Usable commercial corn flours are available, for example, from ConAgra under the trade designations "298" and "302". Wheat flour provides a more dense, heavier product that requires a longer time to achieve the final puffed state.

Usable wheat flour is commercially available, for example, from GMI under the designation "Soft As Silk". Tapioca provides good product consistency, but decreases production velocity because the tapioca absorbs large amounts of moisture when exposed to liquid, resulting in large amounts of swelling during the shaping (e.g., extrusion) process. When used, tapioca is preferably not the sole base ingredient but is typically added to another base at a ratio of about 1:2 to 1:4 tapioca:base to provide an expansion agent to the recipe. Usable tapioca is commercially available, for example, from National Target.

An expansion agent helps provide the puffing quality of the resulting pellets and an example of an expansion agent or additive, in addition to tapioca, is sodium bicarbonate (a.k.a., baking soda). However, because sodium bicarbonate adds a strong flavor to the overall recipe, it is preferably used up to a weight percent of only about 1%.

Salt can be used both as a spice or flavoring or as an expansion additive, and is preferably used up to a weight percent of about 3%. The salt used may be sea salt, sodium chloride, sodium iodine, or other salt approved for human consumption.

Various processing aids can be added to the recipe to aid in processability, that is, the ease at which the pellet material is processed. Examples of usable processing aids include, vegetable oil (commercially available, for example, from Cargill as "Canola") and other oils such as corn oil, coconut oil and peanut oil, and lecithin (commercially available, for example, from Central Soya). Other processing aids that may be beneficial include butter, margarine, coconut milk, and wheat germs. Although processing aids are preferably included during mixing of the pellet recipe, the aids may alternately be dripped into a extruder during extrusion of the material.

Various natural and artificial flavors and spices can be added to the pellets of the present invention. The flavors may be sweet, sour, sugary, savory, tart, spicy, fruity or any other flavor and may be added as a liquid or a solid. Dried powdered flavors are preferred. Examples of flavors include, but are not limited to: butter, cheese(s), sour cream & chive, dill, herb, onion, garlic, jalapeno, bacon, pizza, tomato, salt & vinegar, barbecue, taco, cinnamon, nutmeg, hickory and smoke. Preferably, any flavoring is less than about 3% by weight, but may be more, depending on the concentration, type of flavoring used and the desired effect.

Likewise, various natural and artificial colors can be added to the composition to provide a more pleasing appearance to the pellets. The color may be added as a powder or a liquid, although powders are preferred. Preferably, any added coloring is less than about 0.5% by weight of the total composition.

Other additives, such as vitamin and/or mineral supplements, preservatives, visual particulates, sweeteners, and the like can also be added to the pellet.

To prepare the pellet composition, the desired ingredients are combined in a large mixer, such as a paddle mixer or low shear mixer. Preferably, all the dry ingredients, such as flour, sodium bicarbonate, salt, powdered flavorings, etc., are thoroughly combined before addition of the moist or wet ingredients. Typically, the mixture will be a dry, crumbly mixture that may or may not stick to itself.

An example of a preferred recipe for a microwave expandable, butter-flavored pellet includes: 25–35 parts by weight tapioca, preferably 29.40 parts; 60–70 parts wheat flour, preferably 65.07 parts; up to 1 part sodium bicarbonate, preferably 0.25 part; up to 3 parts flavoring, preferably 1.25 parts; up to 3 parts salt, preferably about 2 parts; up to 2 parts vegetable oil, preferably about 1 part; 0.01–0.5 part coloring, preferably 0.03 part; and up to 2 parts lecithin, preferably about 1 part.

An example of a preferred recipe for a microwave expandable corn pellet includes: 20–25 parts by weight tapioca, preferably 22.69 parts; up to 50 parts corn flour (also known as "masa") preferably about 50; 20–40 parts wheat flour, preferably 23.16 parts; up to 0.5 parts sodium bicarbonate, preferably 0.14 parts; up to 3 parts salt, preferably 2.97 parts; up to 2 parts vegetable oil, preferably none; 0.01–0.5 parts coloring, preferably 0.04 parts, up to 2 parts lecithin, preferably about 1 part; and up to 3 parts flavoring, preferably none.

The moisture content of the pellet mixture is generally about 9 to 11%, depending on the amount of liquids added to the dry ingredients and the amount of moisture retained in the dry ingredients.

Pellet Processing

The above prepared pellet mixture or composition is then compacted and formed into the desired shape. Compaction can be accomplished by any known methods that provide pressure on the composition, for example, a die press, extruder, or even manual pressure. Compaction of the composition mixture is done so that the final pellet form has sufficient integrity and density to withstand handling and other forces that may act on the pellet.

The compacted composition is then shaped into the desired pellet form. Shaping may be accomplished by methods such as molding, die casting, pressing, extrusion, and any other know methods. In some processes, it may be desirable to shape the composition into pellet form prior to compacting the material.

The preferred method of simultaneously compacting and shaping the composition is by extrusion. The extruder produces a high pressure on the composition, thereby compacting the mixture and increasing its density while at the same time shaping the composition to the desired shape. The extruder used may be a single screw, twin screw, ram extruder, or the like. The extruder may have heating and/or cooling zones as desired.

The extruder provides the overall cross-sectional shape and dimension of the pellet. The length of the pellet (taken in the machine direction of the extruder) can be controlled by any cutting system that is capable of cutting or shaping the extruded material. The pellet material may be cut to length immediately as it exits the extruder die, for example by a rotating knife or wire, or may be later cut or otherwise sized or shaped. For example, it may be desirable to chop, cut or crush extended lengths of the pellet material. This may be done to the material soon after extrusion or may be done after drying the material. In some embodiments, it may be possible to crush the dried pellet material into irregular shapes. Some relaxation, expansion or distortion of the pellet shape may occur after extruding, cutting, or any other shaping steps, for example, during drying or any moistening steps.

The pellets may be any shape. For example, three dimensional shapes, such as spheres, ellipses, cubes, "S"-shapes, spirals, and solid or hollow rods or cylinders having any cross-sectional area may be used. Rods and cylinders, both solid and hollow, can have cross-sections that include circles, ellipses, squares, pentagon, hexagon, any polygon, stars, and the like. The surfaces may be smooth or may have a serrated or corrugated surface. Irregular shapes such as flat chips, flakes, double chips, crinkle cuts, bow ties, and the like can also be used, as well as irregular shapes that cannot be characterized as anything but random and irregular.

The size of the pellets may range from about 0.1" (0.25 cm) to 1" (2.54 cm) in diameter. If a rod-shaped pellet is used, the length of the pellet may extend to at least 2" (5 cm) or more, depending on the recipe used for the pellet and the intended final snack product. In one embodiment, a rod-shaped pellet has approximately the same dimensions for its diameter and its length, for example, an outer diameter of about 0.30" (0.76 cm) to 0.40" (1.02 cm) and a length of about 0.20" (0.51 cm) to 0.25"(0.64 cm). In some embodiments, it may be desired to have a long, spaghetti-type pellets with variable lengths.

Typically, 10 grams of pellets include about 10–100 individual pellets, preferably about 30–60, and most preferably about 40–50 pellets. The volume occupied by 10 grams of pellets will vary depending on the size and especially the shape of the pellets.

The shape of the pellet (i.e., flake, barrel, etc.) will have an affect on the moisture content of the final dried product. For example, crinkle cuts (like french fries or small lasagna noodles), because of their shape, generally have a lower moisture content than barrels, which have an optimal moisture content of about 11%. Preferably, the moisture content of the final puffable pellet is about 7–14% by weight, preferably about 11%. Too high of moisture content leads to clumping during the popping process. In a preferred embodiment, the moisture content of the pellet is within a percentage point of the moisture content in the popcorn kernels with which the pellet is mixed. Although it is preferred that the moisture content of the two snacks (pellets and popcorn) is similar, it has been found that one snack having a lower moisture content does not extract or steal moisture from the other, more moist, snack.

It is preferred that the pellets in a single batch have essentially the same moisture level, since the rate of puffing is affected by the moisture in the pellet. The pellets can be allowed to age together so that the moisture equilibrates amount the pellets. Aging may be between a few days to several weeks, depending on the pellets and the storage conditions. It has been found that the pellet is very stable and may be stored up to at least a 6 month time period after processing.

In some embodiments, it may be desired to include additional processing steps in the preparation of the puffable pellets, steps such as a moisturizing step or a drying step to adjust moisture to a selected level. It may be preferable to treat the pellet to stabilize the pellet composition, i.e., moisture content, flavor, etc.

Pellet Coating

In some embodiments it may be desired to coat the exterior of the pellet with a coating, such as an aqueous coating. The coating can be designed to retain moisture in the pellet during storage, to add color or flavor to the pellet, to delay puff time of the pellet, or smooth the outer surface of the puffed pellet. Any flavor added to th coating may be the same or different than the flavor in the pellet.

The coating may comprise a lo w solids solution or composition of proteins, gums, modified food starches, or the like. Flavors, colors or other additives can also be added to the coating material. The coating can be applied to the surface of the pellet by conventional coating methods, such as spray coating. The coating is at least partially dried before the pellets are combined with the popcorn kernels. The coating is fairly thin on the sur face of the pellet, typically about 1–10 microns, and some of th e aqueous coating may impregnate into the pellet. It is preferred that the coating not physically hinder the expansion of the pellet, rather, any puffing delay created by the coating is because the coating seals the pellet to create and keep a homogeneous and uniform expansion over the entire pellet.

Typically, a coating can comprise up to about 5% salt, 5–20%starch or protein up to about 3% flavoring, and up to about 3% coloring. One preferred aqueous coating comprises 3–5% salt, 5% starch, and the remainder water.

Inclusion of this coating on a pellet causes excess expansion of the pellet, approximately 50% more volume than without the coating. Without being limited to a particular theory, it is believed that the dielectric properties of the salt in the coating attract a greater amount of microwave energy, which leads to greater expansion. This inclusion of this preferred coating also results in a smoother surface on the puffed pellet.

Popcorn—Pellet Combination

The popcorn kernels and the pellets are combined and placed in a microwaveable container. An oil or fat slurry may also be added. It is desired that there is a greater amount of popcorn in the bag than pellets. Preferably, the weight ratio of unpopped popcorn kernels to pellets is about 3:1 to 1.25:1, more preferably about 2:1 to 1.5:1. The excess of popcorn minimizes the occurrence of burning and scorching of the puffed pellets and of the popcorn itself, by providing a volatile environment inside the container during the popping process. The explosions of the popping corn agitate the puffed pellets so that the pellets do not remain stationary on the container bottom.

An oil or fat slurry helps provide and transmit the heat necessary to pop the popcorn, and slurries and their uses in microwave popcorn products are well known in the art. The dough pellets will generally puff to completeness without any slurry present, however slurry is preferred to enhance flavor and taste appeal of the popcorn. Without proper popping of the popcorn kernels, the pellets will not be agitated, thus allowing the pellets to remain stationary in the bag, leading to scorching and burning. The oil slurry used in the present invention may be any conventional slurry and may comprise oils, such as vegetable oil, corn oil, coconut oil, fats, such as animal or vegetable fat, salt, and any flavoring. Low fat, low salt, and any other slurries are usable with the present invention.

The amount of slurry is preferably up to about 50% of the weight of the popcorn and pellets combined, and more preferably is between about one-third to one-half of the combined popcorn and pellets. Preferable ranges for the popcorn/pellet/slurry mix are about 50–65 parts by weight popcorn, about 25–40 parts by weight pellets, and about 30–40 parts by weight slurry. A most preferred ratio is about 55 parts popcorn, about 30 parts pellets and about 34 parts slurry.

The popcorn, pellets, and oil slurry may be deposited into the bag in any viable fashion. Preferably, the order of deposit into bag is the pellets, corn, and then the slurry. If the pellets and popcorn are mixed prior to placement in the bag, this mixture is preferably deposited in the bag before the slurry. In some instances it may be desirable to spray the oil slurry onto the pellets and popcorn as they are falling into the bag.

It is possible to provide the overall snack mix with flavor by adding a flavoring, either as a powder or an oil, to the oil slurry. By providing the flavoring to the slurry, the flavor will be fairly evenly distributed among both the popcorn and pellets.

The present invention can also be designed to puff and pop without the presence of an oil slurry or other fat. A fat-free microwave popcorn, and methods for flavoring popcorn without added fat, is taught in U.S. Pat. No. 5,750,166 to Schellhaass, the entire disclosure of which is incorporated herein by reference. Other methods for providing fat-free or low-fat microwave popcorn can also be used in the present invention.

The Container

The popcorn/pellet and any slurry combination is deposited into a microwave popcorn bag or other container suitable for microwave heating. Preferably, the order of deposit into the bag or container is first the pellets, then the popcorn, and then the oil slurry, if present. To reduce steps, the pellets and popcorn can be combined and deposited in one step, followed by the oil slurry.

Microwave popcorn bags usable for the present invention include any known bag for microwave popping popcorn. It is not necessary to provide a bag having any special features or arrangements. Examples of microwave bags for popcorn are taught in U.S. Pat. Nos. 4,450,180 to Watkins, U.S. Pat. No. 4,604,854 to Andreas; and U.S. Pat. No. 4,691,374 to Watkins. Preferably the bag comprises a flexible bag which results from a single folded sheet construction. The term "single folded sheet construction" in this context, refers to a bag folded from a single, flexible, unitary member and not constructed from separate pieces. The "single unitary member" can be a single ply or a multiple ply laminate construction. In preferred arrangements, it is a multiple ply or multi-ply arrangement.

In general, the bag includes first and second panels and a bottom gusset. The bottom gusset is positioned to, when collapsed, be directed inwardly as a two-walled gusset fold positioned between the first and second panels. When the bottom gusset is expanded, however, the bag can be stood upwardly with first and second panels projecting from a bottom formed by the two-walled, base gusset; and, selected ends of the first and second panels. Preferably, a microwave interactive construction is positioned on the first panel.

In use, a popcorn/pellet charge and any slurry is positioned over the microwave interactive construction, and within the bag. As the pellets puff and the popcorn pops, the base gusset expands (the two walls open) and, under steam pressure, the bag vents. After the popping process is completed, the bag can be oriented to stand up on the base, with an open upper end for access to the popcorn snack.

Another container usable for use with the present invention is a paper tub designed for microwave popping of popcorn. An example of such a tub is taught in U.S. Pat. No. 5,834,046 to Turpin et al., the entire disclosure of which is incorporated herein by reference.

The tub generally comprises an outer tub receptacle having rigid walls and a moisture barrier closure positioned within the interior of the receptacle. The tub receptacle is preferably shaped to be approximately cylindrical or cone-like in shape, with an open end for access to the interior. In the typical application, the popcorn, pellets, and oil slurry are enclosed within the moisture barrier closure. In preferred embodiment, the moisture barrier closure includes therein a microwave interactive susceptor.

In use, the popcorn/pellet charge is positioned over the microwave interactive construction, and within the closure within the receptacle. As the pellets puff and the popcorn pops, the moisture barrier expands or extends, pushing the barrier outward so to increase the volume. After the puffing and popping process is completed, the moisture barrier is removed, and the tub receptacle open end provides access to the popcorn snack.

Expanding the Pellets and Popping the Popcorn

The popcorn-pellet combination can be puffed in any microwave oven capable of popping popcorn. Because wattage of microwave ovens vary between about 600 W to 1200 W, heating times to produce the snack combination will vary. A typical, medium wattage oven (e.g., 800 W) will expand the pellets in about 30 to 60 seconds and the popcorn will pop after about 3 minutes of heating. Typically, the pellets puff less than about 120 seconds before the popcorn pops, preferably less than about 90 seconds, more preferably less than about 60 seconds, and most preferably less than about 30 seconds before the popcorn pops. As described earlier, a coating may be included on the pellets to delay the puffing time so that the pellets puff closer to the popcorn popping point. A coating may delay the puffing time as much as 10 seconds or greater.

Soon after heating has begun, the bag or other container will expand in volume. This initial volume expansion is caused by steam forming from the moisture in the pellets and corn kernels. This expansion is desirable because it lifts the bag off from the pellets so that the pellets will be able to puff without being constrained.

Unlike popcorn kernels, the pellets do not create a pop or other explosive noise during puffing. The pellets may produce a quiet "sizzle" sound that may or may not be heard over the noise of the microwave oven. It is believed that this sound is created by the moisture in the pellets contacting the oil as the oil is heating.

Because there is no noise signal from the pellets to alert consumers when the pellets are puffed, there is no signal to indicate when the pellets should be removed from the heat of the microwave to avoid burning of the pellets. Mixing the pellets with popcorn, according to the present invention, eliminates the need to remove the pellets immediately after they have expanded.

As the pellets puff, the popcorn kernels near their popping point. Typically, the majority of the pellets will be puffed before the popcorn pops, though it is prefered to have the puffing and the popping times be close to each other. The explosive nature of the popcorn popping will mechanically agitate the pellets to minimize any burning or scorching of the puffed pellets. Because of the violent movement of the popcorn within the bag, the puffed pellets do not have an opportunity to remain on the bottom of the bag, thus minimizing any burning of the pellets. The popping corn generally has no affect on the puffing of the pellets because the popcorn is stationary (i.e., not popping) during the time period that the pellets are expanding. It is after the pellets have puffed that the popcorn is instrumental in agitating and moving the puffed pellets to minimize burning. It is preferable that the amount of popcorn in the bag is at least equal to, or more preferably at least 20% greater than the amount of pellets to ensure thorough agitation and movement of the pellets. Preferably, the amount of popcorn is at least 35% greater, more preferably at least 50% greater than the amount of pellets in the bag.

After the popcorn has popped, the bag is removed from the microwave oven and allowed to slightly cool. Once the overall snack is cooled to the point of being touchable, a hot, delicious mixed snack comprising popcorn enhanced with a starch-based snack food can be enjoyed.

The invention will be further described and illustrated in the examples which follow. The examples are illustrative of the invention and should not be construed as limiting the scope to their details. All parts, percentages, ratios, etc. are by weight unless otherwise specified.

EXAMPLES

Examples 1 through 4 were prepared by first making a gelatinized starch product by mixing together 29.40 parts (13.35 kg) tapioca, 65.07 parts (29.55 kg) wheat flour, 0.25 parts (0.11 kg) sodium bicarbonate, 1.25 parts (0.57 kg) butter flavoring, 2 parts (0.91 kg) salt, 1 part (0.45 kg) vegetable oil, 0.03 part (0.01 kg) yellow color, and 1.00 part (0.45 kg) lecithin. The mixed dry recipe had a density of about 536 kg/m³. The dry mixture was fed into an extruder system by a feed screw speed of about 13 rpm.

Prior to the actual extruder was positioned a "preconditioner unit" used for moisturizing the dry mixture with steam. The preconditioner unit included a drum rotating at about 150 rpm through which steam at a rate of about 15.5 kg/hr was fed to produce a temperature of about 195° C. The mixture exiting the preconditioner had a moisture level of about 29.41%.

The moisturized mixture was fed into a single screw extruder rotating at a speed of about 160 rpm. The extruder had 9 heating zones: zones 1, 2 and 3 at 40° C., zones 4, 5 and 6 at 75° C., and zones 7, 8 and 9 at 70° C. The temperature of the die spacer was maintained at 73° C. throughout the run.

The die used to shape the extrudate was a "ziti" barrel die, so that the extrudate had a hollow cylindrical form. The rate of discharge from the extruder was about 72 kg/hr. A knife rotating at 8 rpm was used to cut the extrudate into barrel lengths of about 0.2" to 0.4" as it exited the extruder die. The moisture content in the discharged extrudate was about 34.52%.

The barrels were dried in a conventional belt drier having three zones, although all zones were maintained at 82° C. The barrels were passed through the drier twice; the first time at a bed depth of about 5 cm, the second time at a depth of about 40 cm. The resulting moisture content of these gelatinized barrels was about 11%. The hollow cylindrical barrels were approximately 0.8 cm high, with an outer diameter of about 1 cm and an inner diameter of about 0.5 cm.

The gelatinized barrels were combined with hulled popcorn kernels and placed in a microwave bag having a charge of a fat/oil slurry. The bags used were conventional microwave popcorn paper bags having a microwave interactive susceptor in the bottom of the bag. The fat/oil slurry consisted of 30.84 parts by weight partially hydrogenated soybean oil that had been melted, 3.06 parts fine salt, 0.09 part powdered natural butter flavor, and 0.01 part Annato oil (for color). The bags with popcorn, pellets and oil were manually sealed and placed one at a time in a medium wattage microwave oven (800 W oven, commercially available from "Sharp") and the snack was popped for the time indicated. The results from testing Examples 1–4, having various ratios of corn/pellets/slurry, are reported below in Table 1. The interior of the microwave oven was allowed to cool to room temperature between tests.

Example 1 was a 60/40/40 weight ratio of popcorn/pellets/oil slurry; Example 2 was a 60/40/35 ratio; Example 3 was a 60/40/30 ratio; and Example 4 was a 50/40/35 ratio. Example 1 * was a second trial of Example 1. Three to four bags of each sample were prepared.

TABLE 1

| Example & Bag No. | Pop time, min:sec | Total popped volume, cm³ | Unpopped kernels, grams | Performance |
| --- | --- | --- | --- | --- |
| 1-1 | 2:15 | 2250 | 16.48 | good |
| 1-2 | 2:15 | 1850 | 23.57 | popcorn unpopped |
| 1-3 | 2:30 | 2150 | 16.90 | good |
| 1-4 | 2:45 | 2200 | 15.24 | good |
| 2-1 | 2:45 | 2200 | 14.15 | good |
| 2-2 | 2:15 | 1850 | 26.08 | good |
| 2-3 | 3:00 | 2750 | 5.57 | some browning, poor |
| 3-1 | 2:15 | 1400 | 31.49 | good |
| 3-2 | 2:45 | 2750 | 5.68 | burnt, poor |
| 3-3 | 3:00 | 3000 | 3.58 | some burnt, poor |

TABLE 1-continued

| Example & Bag No. | Pop time, min:sec | Total popped volume, cm³ | Unpopped kernels, grams | Performance |
|---|---|---|---|---|
| 3-4 | 2:30 | 2450 | 10.00 | good |
| 4-1 | 2:15 | 1900 | 11.00 | good |
| 4-2 | 2:30 | 2450 | 3.80 | good, browning |
| 4-3 | 2:45 | 2300 | 3.62 | slight browning |
| 1*-1 | 2:15 | 2150 | 17.49 | good |
| 1*-2 | 2:15 | 1250 | 35.60 | popcorn unpopped |
| 1*-3 | 2:30 | 2150 | 15.63 | good |

The low popped volume of Example 1*-2 was most likely caused by improper venting of the bag, which is typically the result of an inadequately sealed bag.

Examples of other pellets were produced by the general method described for Examples 1–4 above. Examples 5–13, having the recipes shown in Table 2, were produced and were mixed with unpopped popcorn kernels in paper bags, and popped in a microwave. All recipes provided pellets that were puffable in a microwave oven when combined with popcorn. All recipe amounts reported in Table 2 are weight percentages.

TABLE 2

|  | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|
| corn flour | 25.00 | 50.00 | 50.00 | 0 | 0 | 0 | 0 | 0 | 25.00 |
| wheat flour | 48.16 | 31.05 | 31.01 | 64.70 | 65.14 | 65.03 | 65.03 | 65.07 | 48.16 |
| tapioca | 22.69 | 14.80 | 14.80 | 29.02 | 29.07 | 29.22 | 29.19 | 29.40 | 22.69 |
| sodium bicarbonate | 0.14 | 0.14 | 0.14 | 0.25 | 0.25 | 0.25 | 0.25 | 0.25 | 0.14 |
| vegetable oil | 0 | 0 | 0 | 1.00 | 1.00 | 1.00 | 1.00 | 1.00 | 0 |
| salt | 3.01 | 3.01 | 3.01 | 2.00 | 2.00 | 2.00 | 2.00 | 2.00 | 2.97 |
| lecithin | 1.00 | 1.00 | 1.00 | 1.00 | 1.00 | 1.00 | 1.00 | 1.00 | 1.00 |
| color | 0 | 0 | 0.04 (yellow) | 0.03 (yellow) | 0.03 (red) | 0 | 0.03 (yellow) | 0.03 (yellow) | 1.04 (yellow) |
| flavor | 0 | 0 | 0 | 2.00 (butter) | 1.50 (jalapeno) | 1.50 (bacon) | 1.50 (pizza) | 1.25 (butter) | 0 |

The foregoing description, which has been disclosed by way of the above examples and discussion, addresses embodiments of the present invention encompassing the principles of the present invention. The embodiments may be changed, modified and/or implemented using various types of arrangements. Those skilled in the art will readily recognize various modifications and changes which may be made to the present invention without strictly following the exemplary embodiments and applications illustrated and described herein, and without departing from the scope of the present invention which is set forth in the following claims.

I claim:

1. A method of producing a combination popcorn snack, the method comprising the steps of:
   providing a charge of unpopped popcorn kernels and pre-gelatinized starch-based pellets, the pellets having a moisture content between about 7–14% by weight, the popcorn and pellets present in a weight ratio between about 3:1 to 1.25:1; and
   subjecting the combined charges to microwave energy so that the pellets puff and the popcorn pops.

2. The method according to claim 1, further comprising providing a charge of oil slurry at a ratio to the popcorn and pellet charge less than about 1:2 and combining the popcorn and pellet charge with the slurry charge.

3. The method according to claim 1, further comprising placing the popcorn and pellet charge in a container prior to subjecting to microwave energy.

4. The method according to claim 3, wherein the container includes a microwave interactive susceptor.

5. The method according to claim 4, wherein the container is a bag.

6. The method according to claim 4, wherein the container is a tub.

7. The method according to claim 1, further comprising applying an aqueous coating on the pellets.

8. The method according to claim 7, wherein the aqueous coating comprises a flavor.

9. The method according to claim 7, wherein applying comprises spraying.

10. The method according to claim 1, wherein the pellets puff less than 60 seconds before the popcorn pops.

11. The method according to claim 10, wherein the pellets puff less than 30 seconds before the popcorn pops.

12. A microwaveable snack comprising popcorn kernels and puffable pre-gelatinized starch-based pellets, the popcorn kernels and puffable pellets present in a weight ratio between about 3:1 to 1.25:1.

13. The microwaveable snack according to claim 12, wherein the popcorn kernels and puffable pellets are present in a weight ratio between about 2:1 to 1.5: 1.

14. The microwaveable snack according to claim 12, wherein the pellets are barrels.

15. The microwaveable snack according to claim 12, wherein the pellets include an aqueous coating.

16. Ihe microwaveable snack according to claim 15, wherein the coating comprises starch.

17. The microwaveable snack according to claim 15, wherein the coating comprises a flavor.

18. The microwaveable snack according to claim 12, wherein the pellets and popcorn kernels are in a bag.

19. The microwaveable snack according to claim 12, wherein the pellets and popcorn kernels are in a tub.

20. The microwaveable snack according to claim 12, further comprising fat.

* * * * *

UNITED STATES PATENT AND TRADEMARK OFFICE
CERTIFICATE OF CORRECTION

PATENT NO. : 6,083,552
DATED : July 4, 2000
INVENTOR(S) : Kershman et al.

It is certified that error appears in the above-identified patent and that said Letters Patent is hereby corrected as shown below:

Column 1,
Line 47, "chccse-puffs" should read -- cheese-puffs --
Line 47, "tcndcney" should read -- tendency --

Column 2,
Line 65, insert -- to -- after the word "pellets"
Line 66, "convention al" should read -- conventional --

Column 3,
Line 3, "ather" should read -- Rather --
Line 5, "pheres" should read -- spheres --
Line 25, "Pellet Composition" should be on line 24 as a heading
Line 31, "oxes" should read -- ones --
Line 32, "i n" should read -- in --
Line 36, "bunr" should read -- burn --

Column 5,
Line 1, insert -- , -- after the word -- "masa") --

Column 6,
Line 4, delete "a" after the word "have"
Line 48, "th" should read -- the --
Line 50, "lo w" should read -- low --
Line 57, "sur face" should read -- surface --
Line 58, "th e" should read -- the --

Signed and Sealed this

Sixteenth Day of October, 2001

Attest:

NICHOLAS P. GODICI
Attesting Officer   Acting Director of the United States Patent and Trademark Office